N. T. SCOTT.

Assignor to F. C. TOMLINSON, Trustee.

Advertising Apparatus.

No. 8,355. Reissued July 30, 1878.

*Witnesses:*
Henry Eichling
H. Wells Jr.

*Inventor:*
Nelson T. Scott
per James A. Whitney
Atty.

THE NORRIS PETERS CO., WASHINGTON, D. C.

UNITED STATES PATENT OFFICE.

NELSON T. SCOTT, OF WESTVILLE, CONNECTICUT, ASSIGNOR TO FREDERICK C. TOMLINSON, TRUSTEE.

IMPROVEMENT IN ADVERTISING APPARATUS.

Specification forming part of Letters Patent No. 202,966, dated April 30, 1878; Reissue No. 8,355, dated July 30, 1878; application filed June 13, 1878.

*To all whom it may concern:*

Be it known that I, NELSON T. SCOTT, of Westville, in the county of New Haven and State of Connecticut, have invented an Improvement in Advertising Apparatus, of which the following is a specification:

The invention is more especially adapted for advertising purposes, and each view, which may be, for example, the representation of a business-card, is held stationary with reference to the lantern for a sufficient length of time to attract due attention, there being by this means provided an effective method of calling public attention to the moving advertisements without superintendence or attention.

The invention comprises a novel combination of parts whereby the requisite intermittent movement of the circular frame with reference to the hood and lens of the magic lantern is provided for.

Figure 1:
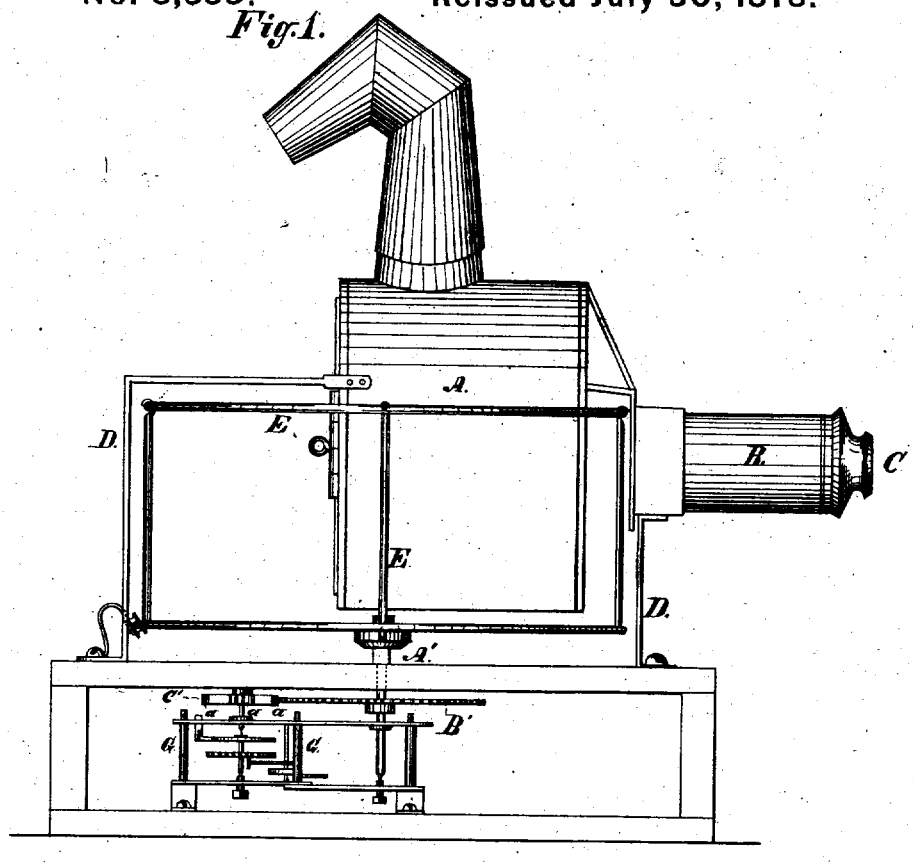
Figure 2:
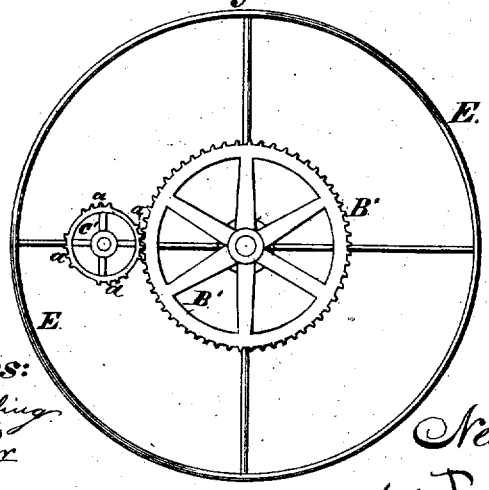

Figure 1 is a side elevation of an apparatus made according to my invention, and Fig. 2 a plan view of a portion of the mechanism indicated in Fig. 1.

A is the hood or body of the magic lantern, and B the cylinder, in the outer end of which is provided the lens C, the usual lamp or illuminating device being provided in the ordinary manner with the hood A. The hood A is suspended upon braces or standards D, to permit the requisite play of the horizontal circular frame E, this latter carried upon a vertical axial shaft, A′, on which is also provided the spur-wheel B′. This spur-wheel B′ receives an intermittent motion by the action of the tooth-sectors *a*, provided on the wheel C′, actuated by a system of ordinary clock-work. (Represented at G in Fig. 1.)

The views to be displayed are arranged around the circumference of the circular frame D and attached thereto in any suitable manner; and inasmuch as the said frame receives an intermittent movement corresponding to that of the spur-wheel B′, and inasmuch as the parts are so arranged that each intermission in the movement of the frame brings one of the views into due relation with the lamp and lens of the magic lantern, it follows that the said views will be presented in succession to the lantern, to be magnified and displayed thereby, each view remaining in such immovable position a length of time proportioned to the distance between the toothed sectors *a* on the wheel C′, each view being, of course, displayed during such period with full and good effect.

What I claim as my invention is—

An advertising apparatus comprising the following elements, viz: a circular frame arranged to move in a horizontal plane, a magic lantern having its hood or body arranged within the circumference of said circular frame, a lens, and mechanism for giving an intermittent rotary movement to the circular frame, all substantially as and for the purpose herein set forth.

N. T. SCOTT.

Witnesses:
H. WELLS, Jr.,
A. R. PAGE.